Sept. 15, 1925.
T. A. KENNEDY
1,553,942
WINDSHIELD CLEANER FOR VEHICLES
Filed June 7, 1924
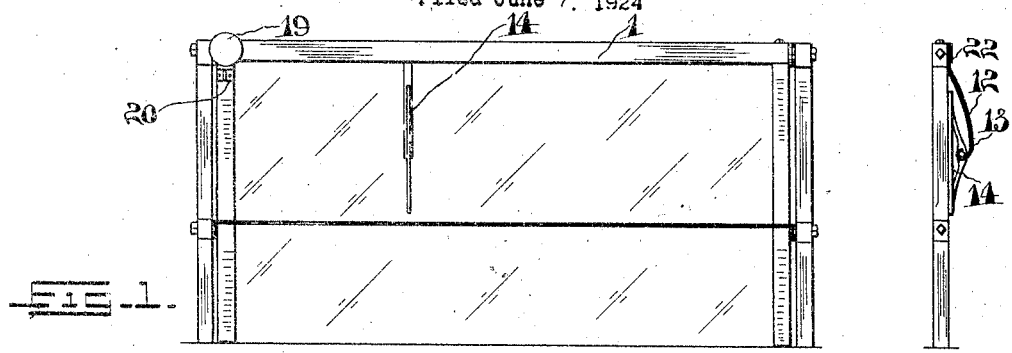
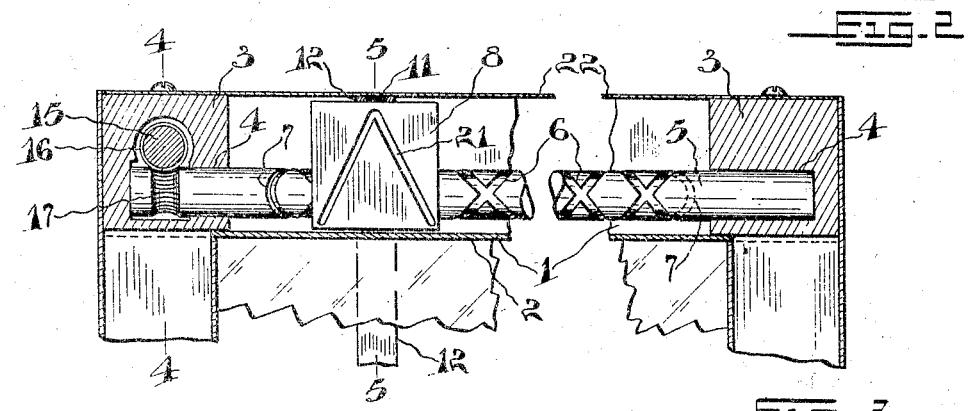
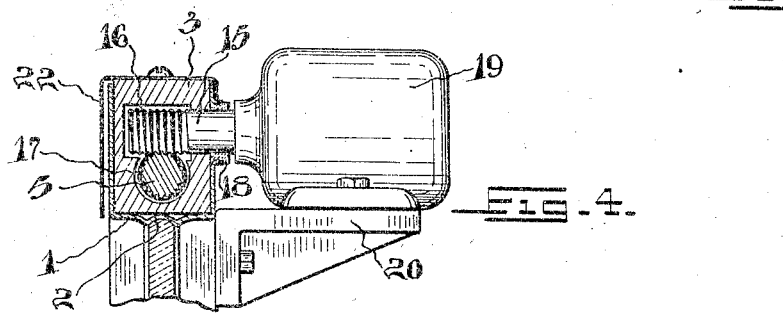
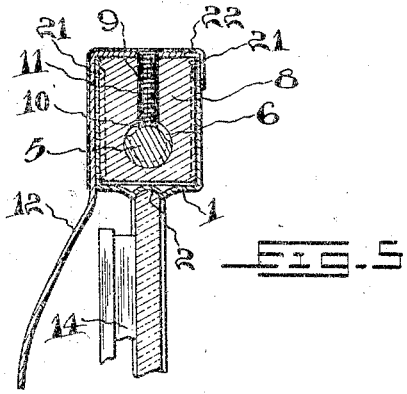
INVENTOR.
T. A. Kennedy.
BY J. Edward Maybee.
ATTY Patented Sept. 15, 1925.

1,553,942

UNITED STATES PATENT OFFICE.

THOMAS A. KENNEDY, OF TORONTO, ONTARIO, CANADA.

WINDSHIELD CLEANER FOR VEHICLES.

Application filed June 7, 1924. Serial No. 718,453.

*To all whom it may concern:*

Be it known that I, THOMAS A. KENNEDY, of the city of Toronto, in the county of York, Province of Ontario, Canada, a subject of the King of Great Britain, have invented certain new and useful Improvements in Windshield Cleaners for Vehicles, of which the following is a specification.

This invention relates to windshield cleaners of the reciprocating type, and my object is to devise an electrically operated cleaner, which may be operated with a minimum of power, and which may be built into the windshield frame in such a manner as to hide all working parts except the motor.

I attain my object by means of the constructions hereinafter described and illustrated in the accompanying drawings in which—

Fig. 1 is a rear elevation of a windshield showing my improved cleaner in position;

Fig. 2 a side elevation of the same;

Fig. 3 a longitudinal section of the same, partly broken away, and on an enlarged scale;

Fig. 4 a section on the line 4—4 in Fig. 3, parts being shown in elevation; and

Fig. 5 a section on the line 5—5 in Fig. 3.

In the drawings like numerals of reference indicate corresponding parts in the different figures.

1 is the top frame section of a windshield, this being formed as a U-shaped trough having the open side uppermost and its bottom formed with a groove 2 to receive the edge of the glass panel of the windshield. In each end of this trough is fixed a block 3, these blocks being brazed, soldered or otherwise secured in position to form oil tight joints with the bottom and sides of the trough. In each block is formed a recess 4 forming bearings for the ends of the shaft 5. These bearing recesses, it will be noted, do not extend entirely through the blocks. The shaft 5 has right and left hand threads 6 formed therein, these threads being joined at their ends by the loops 7. Mounted to slide on the shaft is a traveller 8, which is prevented from turning on the shaft by its engagement with the sides of the trough.

Mounted in this traveller is a pin 9 provided with a head 10 adapted to engage in the threads 6. This pin should be of substantially the width of the thread grooves and slightly longer so that it will properly pass the points where the threads intersect, while it must be capable of travelling round the loops 7. In the preferred form a threaded hole is formed in the traveller into which is screwed a threaded bushing 11 which forms a bearing for the pin 9. The pin may thus be introduced from the top of the block and the bushing screwed down into position.

Secured to the top of the traveller is a scraper connection 12 which extends forwardly and downwardly. The lower part of this connection at least is preferably formed as a bowed spring 13, which is pivotally connected with the middle of the scraper 14, which is of the ordinary type formed of a metal back and carrying a rubber scraping edge. It is evident that as long as the shaft is rotated the traveller will reciprocate in the trough carrying the scraper with it.

Referring particularly to Figs. 3 and 4, the construction of the drive will best be understood. A drive shaft 15 is journalled in the block 3 above the shaft 5. This drive shaft has a worm 16 cut therein adapted to engage the gear 17 cut in the shaft 5. The gear and the worm being cut below the peripheries of the respective shafts, the latter are easily pushed into position in their bearings in the block and the worm engaged with the gear.

Where the shaft extends through the side of the trough, a felt oil washer 18 is preferably secured in position by means of a suitable collar. While any means may be employed of driving the shaft 15, I show an electric motor 19 directly connected thereto, this motor being mounted on a bracket 20 secured to the windshield frame.

The bottom of the trough will contain oil, so that the shaft 5 runs in an oil bath, sufficient oil passing into the bearing recesses 4 for the lubrication of the shaft ends and for the lubrication of the worm 16, gear 17 and shaft 15.

In order to properly lubricate the rubbing surfaces of the traveller 8 and trough 1, I provide the sides of the block with the inclined grooves 21 up which the oil tends to flow as the traveller is moved in one direction or the other.

In order to exclude dust and dirt, I secure a cover 22 to the rearward side of the trough, which cover extends forwardly and then downwardly in front of the trough just leaving sufficient room for the passage of the scraper connection 12.

It will be found that a windshield scraper constructed substantially as described will operate satisfactorily and with a minimum of wear, while any parts subject to wear are easily removed and replaced.

What I claim is:—

1. In a windshield cleaner, the combination of a frame member formed as a U-shaped trough; a block at each end of the trough sealing said ends and adapting the trough to contain a bath of oil; a shaft formed as with a right and left hand thread journaled in said blocks adjacent the bottom of the trough; a traveller mounted on the shaft to slide in said trough and provided with a pin engaging the thread of the shaft; a connection for a scraper secured to the top of said traveller and extending forwardly and downwardly; a scraper mounted on said connection; a driving shaft extending through one side of the trough and into one of the end blocks above the traveller shaft, a worm on said driving shaft; and a gear on the traveller shaft with which the worm meshes.

2. In a windshield cleaner, the combination of a frame member formed as a U-shaped trough; a block at each end of the trough sealing said ends and adapting the trough to contain a bath of oil; a shaft formed as with a right and left hand thread journaled in said blocks adjacent the bottom of the trough; a traveller mounted on the shaft to slide in said trough and provided with a pin engaging the thread of the shaft; a connection for a scraper secured to the top of said traveller and extending forwardly and downwardly; a scraper mounted on said connection; a driving shaft extending through one side of the trough and into one of the end blocks above the traveller shaft, a worm on said driving shaft; a gear on the traveller shaft with which the worm meshes; and a cover secured to one side of the trough, a slot being left between the cover and the adjacent side of the trough for the passage of the scraper connection.

3. In a windshield cleaner, the combination of a frame member formed as a U-shaped trough; a block at each end of the trough sealing said ends and adapting the trough to contain a bath of oil; a shaft formed as with a right and left hand thread journalled in said blocks adjacent the bottom of the trough; a traveller mounted on the shaft to slide in said trough, having inclined oil grooves formed in its trough engaging sides, and provided with a pin engaging the thread of the shaft; a connection for a scraper secured to the top of said traveller and extending forwardly and downwardly; a scraper mounted on said connection; a driving shaft extending through one side of the trough and into one of the end blocks above the traveller shaft; a worm on said driving shaft; and a gear on the traveller shaft with which the worm meshes.

Signed at Toronto, Canada, this 21st day of May, 1924.

THOMAS A. KENNEDY.